UNITED STATES PATENT OFFICE.

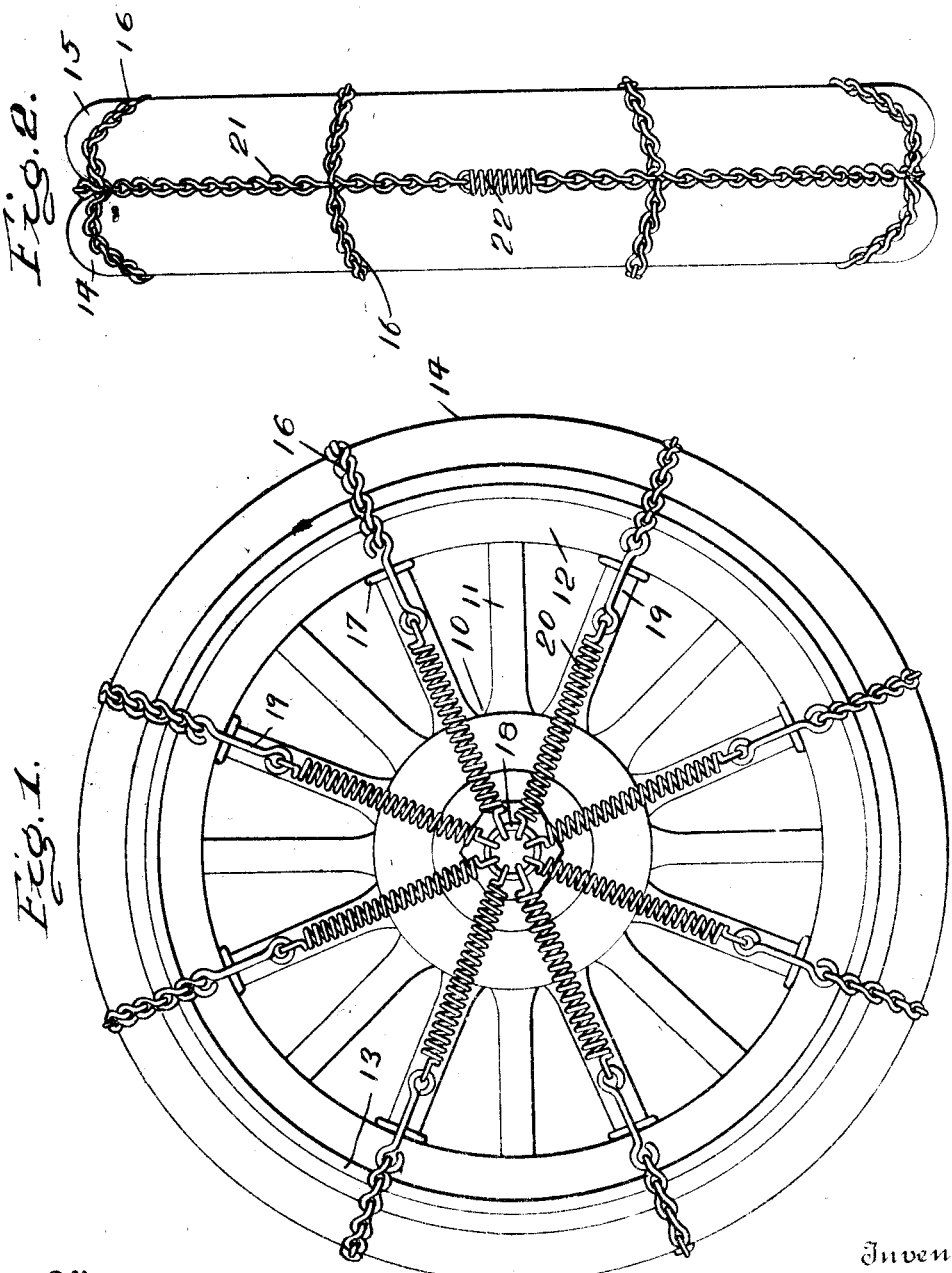

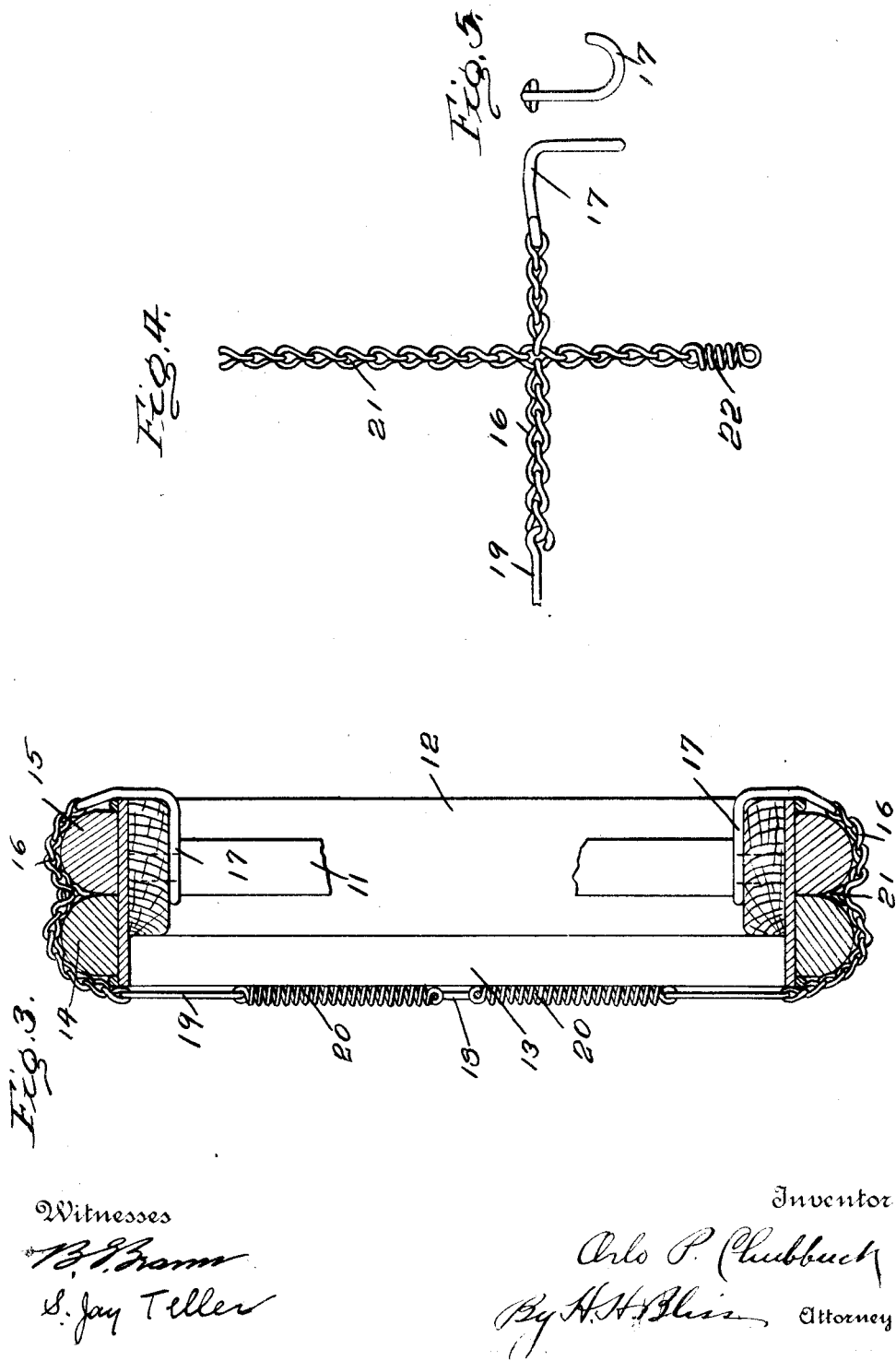

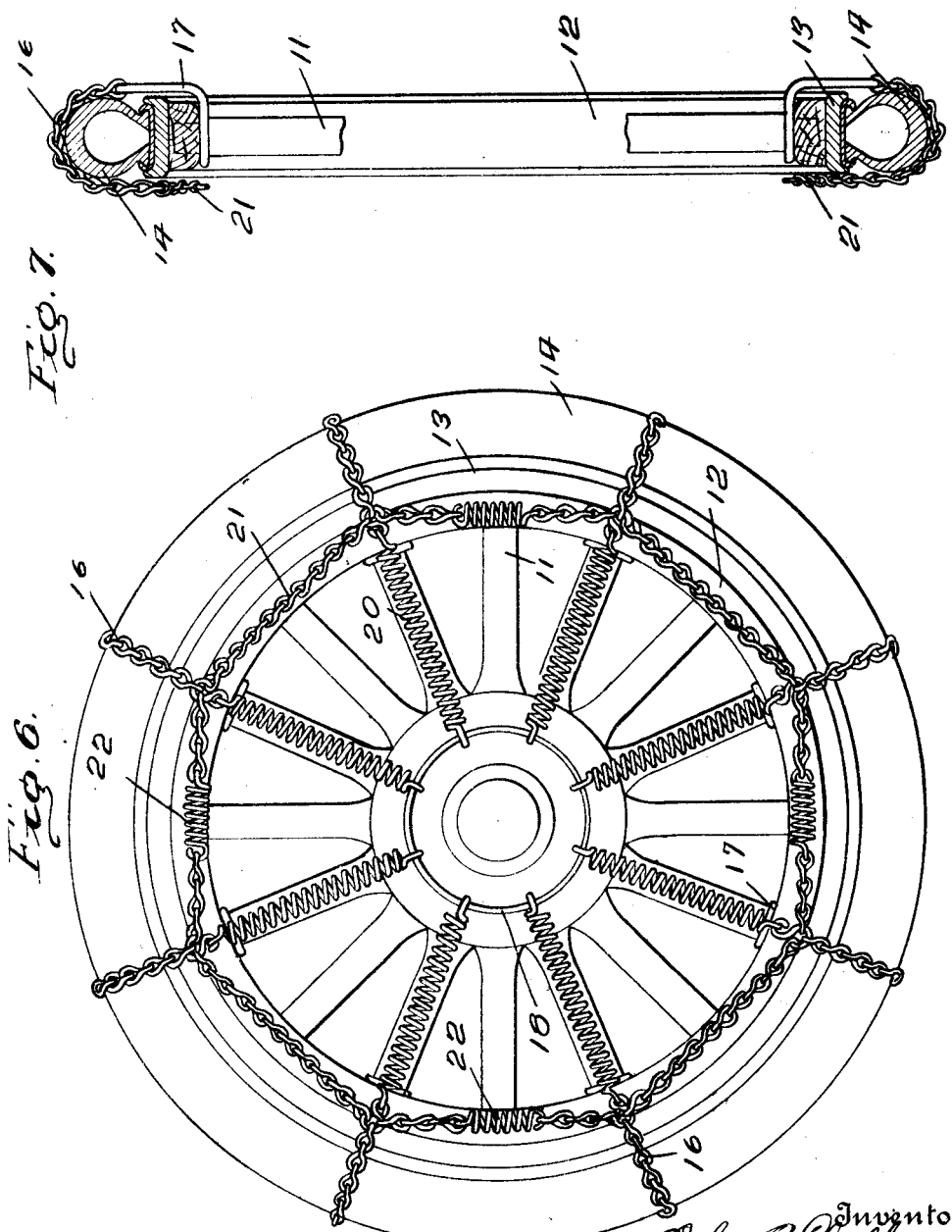

ORLO P. CHUBBUCK, OF PEORIA, ILLINOIS, ASSIGNOR TO AVERY COMPANY, A CORPORATION OF ILLINOIS.

ANTISLIPPING DEVICE FOR TIRES.

1,131,116. Specification of Letters Patent. Patented Mar. 9, 1915.

Application filed March 7, 1910. Serial No. 547,825.

*To all whom it may concern:*

Be it known that I, ORLO P. CHUBBUCK, a citizen of the United States, residing at Peoria, in the county of Peoria and State of Illinois, have invented certain new and useful Improvements in Antislipping Devices for Tires, of which the following is a specification, reference being had therein to the accompanying drawing.

This invention relates to anti-slipping and anti-skidding devices for vehicle wheels and particularly to devices for this purpose now known as grip-chains.

The grip-chain of the present invention is especially applicable to wheels of heavy auto-vehicles having broad tires, though by slight modification it is applicable to the driving wheels of any auto-vehicle.

The principal object of the invention is to provide a device having all of its parts permanently connected together and adapted to be readily attached or detached manually without the use of any special tools whatever. It is possible for the driver to place one of the devices embodying my invention adjacent a wheel and to manually carry the several chains around the tire and hook them to the spokes. The springs permit sufficient yielding for the engagement of the hooks and after engagement serve to tension the chains and hold them against indefinite displacement.

In the accompanying drawings which form a part of this specification, Figure 1 represents in face view a wheel of an auto-truck to which the grip-chain of this invention is shown applied; Fig. 2 is an edge view of the same; Fig. 3 is a vertical, diametrical section through the wheel and grip-chain represented in Fig. 1; Fig. 4 is a view giving a detail of the grip-chain; Fig. 5 is a detailed view of one of the attaching hooks of said chain; Fig. 6 represents in face view a wheel of a lighter automobile showing the grip-chain applied thereto and slightly modified; and Fig. 7 shows in vertical, diametrical section the wheel seen in Fig. 6 and a portion of the anti-slipping device seen in Fig. 6.

Heavy auto-wagons or trucks are commonly provided with wide-tired wheels. In the drawings such a wheel is shown in Figs. 1-3.

The hub is indicated at 10, the spokes at 11, the felly at 12, and the steel rim at 13. The tire is shown as dual or consisting of two parallel ribs or bands, 14 and 15, of rubber or other suitable material, or it may be a single tire with a radial groove or depression dividing the tread circumferentially.

The anti-slipping device is preferably made up of cross-chains as 16 provided at one end with loop links or hooks as 17 so bent or formed as to take around the spokes and lie snugly against the rim 13. These hooks 17 represent any suitable attaching device. The other ends of the cross-chains are connected to a central ring 18, preferably by means of links 19 and spiral springs 20, which provide for the ready attachment of the hooks to the spokes in applying the device to a wheel and for the detachment of said hooks in removing the device when no longer needed. The outer eyes of each link 19 may be left sufficiently open to permit the insertion and removal of the end links of the associated cross-chains, and so provide for the ready application of the grip-chain to the wheel.

The hooks engaging the spokes prevent undue shifting of the cross-chains circumferentially upon the tires and, as a further safeguard against such movement of the cross-chains, an endless chain such as seen at 21 joins the cross-chains together. This chain 21, on dual-tired wheels, preferably lies between the members of said tire or in the medial groove as shown in Figs. 2 and 3. On single-tired wheels, the chain 21 is preferably so connected to the cross-chains as to rest in close proximity to the rim of the wheel, Figs. 6 and 7. In both instances one or more spiral springs as 22 are preferably inserted in chain 21 to provide for the ready application and removal of the anti-slipping device and to hold it snugly in place thereby preventing rattling. Obviously the eyes in the outer ends of links 19 may be closed, particularly in light grip-chains, and the resiliency of the springs 20 and 21 be relied upon in attaching the hooks 17 to the spokes of the wheel and in detaching them therefrom, thus avoiding the annoyance of accidental separation attendant upon the use of separable connection in the members of the anti-slipping device. When the grip-chain, in the form shown in Fig. 6, is intended for use on light vehicles, the central ring 18 and springs 20 may be omitted, as shown in Fig. 7, the chain 21 and its springs 22 being sufficient to hold the cross-chains in place on one side of the wheel, while the hooks 17 hold them in place upon the other side. In this form, the resilient device, or connection, to which the cross-chains are attached at one side of the wheel is simply the chain 21 with the inserted springs 22, instead of the ring 18 and the radiating springs 20 with their links 19.

It will be clear that the hooks 17 at the ends of the cross chain 16 are the sole means of final attachment to the wheel and that while readily attachable and detachable, they nevertheless, when attached, serve to firmly hold the chains against indefinite movement circumferentially and against movement transversely. And the chains are maintained taut at all times by the resilient spring structure consisting in the construction shown on Fig. 1 of the springs 20, 20, and consisting of the construction shown in Fig. 6 of the springs 20, 20, the chains 21, 21, and the springs 22, 22. Each cross chain therefore is firmly but detachably secured to a spoke and is resiliently held at the other end to be tensioned.

The device as a whole is unitary and all of its parts are firmly secured together. When the device is removed from the wheel, it can be handled freely without danger of loss of any of its parts. And when it is to be attached, it is only necessary for the driver to hook first one and then another of the chains around the tire and over the spokes, the springs yielding sufficiently to permit this. The anti-skidding device itself comprises no parts whatever which are to be attached to or detached from each other in securing the device to the wheel.

The invention claimed is:—

1. An anti-skidding device for a wheel tire, having the following parts in combination and permanently secured in fixed positions of engagement with each other to constitute a unitary structure, a series of anti-skid chain sections, each adapted to encircle a tire and each provided with an open hook adapted to engage the outer end of a wheel spoke, a spring structure connected to the said chains at the ends opposite to the hooks and exerting tension thereon, and a flexible spacing device extending around the axis in lines near the periphery of the wheel and connected to the chain sections, the said structure being adapted to be, as a unitary entirety, attached to and separated from a wheel by merely engaging and disengaging the said open hooks.

2. An anti-skidding device for a wheel tire, having the following parts in combination and permanently secured in fixed positions of engagement with each other to constitute a unitary structure, namely, a series of radial coiled springs, a common connecting device at the inner ends of the springs, a series of anti-skid chain sections respectively linked to the outer ends of the radial springs, each chain adapted to encircle a tire and provided with an open hook adapted to engage the outer end of a wheel spoke and exert tension thereon in an outward axial direction on the side of the wheel opposite to that adjacent the radial springs, and a flexible spacing device extending around the axis in lines near the periphery of the wheel and connected to the chain sections, the said structure being adapted to be, as a unitary entirety, attached to and separated from a wheel by merely engaging and disengaging the said open hooks.

In testimony whereof I affix my signature, in presence of two witnesses.

ORLO P. CHUBBUCK.

Witnesses:
J. M. CALDWELL,
J. B. DRAKE.